US007134678B2

(12) United States Patent
Lindkvist et al.

(10) Patent No.: US 7,134,678 B2
(45) Date of Patent: Nov. 14, 2006

(54) WHEELCHAIR

(75) Inventors: Bo Lindkvist, Anderstorp (SE); Morgan Ferm, Åkarp (SE); Leif Dahlberg, Gislaved (SE); Magnus Riisgaard, Anderstorp (SE); Gunnar Sundström, Forsheda (SE)

(73) Assignee: Etac Ab (SE)

( * ) Notice: Subject to any disclaimer, the term of this patent is extended or adjusted under 35 U.S.C. 154(b) by 0 days.

(21) Appl. No.: 10/498,578

(22) PCT Filed: Dec. 3, 2002

(86) PCT No.: PCT/SE02/02214

§ 371 (c)(1), (2), (4) Date: Jun. 9, 2004

(87) PCT Pub. No.: WO03/061543

PCT Pub. Date: Jul. 31, 2003

(65) Prior Publication Data

US 2005/0012302 A1 Jan. 20, 2005

(30) Foreign Application Priority Data

Dec. 11, 2001 (SE) .................................... 0104152

(51) Int. Cl.
*B62M 1/14* (2006.01)

(52) U.S. Cl. .............................. 280/250.1; 297/DIG. 4

(58) Field of Classification Search ............ 280/304.1, 280/250.1, 47.4, 47.41, 47.38; 297/338, 297/344.1, 344.12, 344.13, 344.18, DIG. 4
See application file for complete search history.

(56) References Cited

U.S. PATENT DOCUMENTS

| | | | | |
|---|---|---|---|---|
| 3,937,490 | A * | 2/1976 | Nasr | 280/250.1 |
| 4,592,570 | A * | 6/1986 | Nassiri | 280/650 |
| 4,852,899 | A * | 8/1989 | Kueschall | 280/250.1 |
| 4,989,890 | A * | 2/1991 | Lockard et al. | 280/42 |
| 5,176,393 | A * | 1/1993 | Robertson et al. | 280/250.1 |
| 5,356,172 | A * | 10/1994 | Levy et al. | 280/650 |
| 5,564,786 | A * | 10/1996 | Peek et al. | 297/452.4 |
| 6,296,265 | B1 * | 10/2001 | Lovins | 280/250.1 |
| 6,331,036 | B1 * | 12/2001 | Papac | 301/111.05 |
| 6,352,307 | B1 * | 3/2002 | Engman | 297/284.11 |

* cited by examiner

*Primary Examiner*—Kevin Hurley
(74) *Attorney, Agent, or Firm*—Bachman & LaPointe

(57) ABSTRACT

A wheelchair comprises a frame which supports the wheels, the seat, back rest, and foot rests of the wheelchair. The seat, the back rest, and the foot rests are adjustable in relation to one another. The frame comprises a lower and an upper frame section. On the lower frame section there are disposed the wheels of the wheelchair, and on the upper frame section there are disposed the seat, the back rest, and the foot rests. The wheelchair has an adjustment device for vertical adjustment of the upper frame section in relation to the lower.

10 Claims, 5 Drawing Sheets

WHEELCHAIR

BACKGROUND OF THE INVENTION

1. Technical Field

The present invention relates to a wheelchair, comprising a frame which supports, on the one hand, the wheels of the wheelchair and, on the other hand, its seat, back rest and, where applicable, its foot rests, the seat, the back rest and, where applicable, also the foot rests being adjustable in relation to one another.

2. Prior Art

There are many types of wheelchairs and they have long been developed so as to be increasingly usable and readily operable for the user sitting in the wheelchair. In general, wheelchairs have most or all of the following components: a seat on which the user sits, a back rest in connection with the seat, handles in connection with the back rest if any person other than the user is to move the wheelchair forwards, foot rests if there is a need for them, and a chassis or a frame which supports the previously mentioned components. All parts are, in most modern wheelchairs, adjustable for an adaptation to suit the user.

There are also numerous variations of modern wheelchairs, for example, the method of propulsion differs between various types of wheelchairs. Certain types of wheelchairs are intended to be propelled forwards by the user, at least from time to time. For this to be possible, two of the wheels are sufficiently large for the user to be able to reach them and revolve them. Wheelchairs which are intended to be propelled only by a person other than the user or with the aid of a drive motor may be provided only with small wheels which cannot be reached by the user. Wheelchairs may also be manufactured with either a fixed or a collapsible frame. The choice of frame type depends on the user's needs, for example if there is a need to transport the wheelchair in a normal private car, where the collapsible variation is often preferable.

Since a user spends much time in the wheelchair, at least if the need for a wheelchair is permanent, the adaptation capability of the wheelchair to the user is of paramount importance. As a result, stress- or wear injuries may be avoided or at least reduced and, moreover, the user may gain maximum benefit from a well-adapted wheelchair. However, one problem in the adjustment of the wheelchair is that if the adjustment of a part of the wheelchair is altered, for example its height, this alteration entails a series of consequential modifications such as alteration of the seat and the foot rests. A further drawback is that a large number of various tools are required in order to carry out these various modifications.

A further serious problem is that also brakes and other safety devices must be adjusted when the basic adjustment of other parts of the wheelchair is altered. If this is not put into effect, the safety function may be disabled and, as a result, the wheelchair may be dangerous to use.

Finally, a complex adjustment entails that temporary alterations to, for example, the height of the wheelchair in order to adapt it to different environments is not carried out. Instead, the user must be content with an imperfectly adapted wheelchair on certain occasions. If, on the other hand, such adjustment had been easier to put into effect the mental resistance to temporary re-adjustments is not as great, and the user may gain maximum benefit from the wheelchair.

SUMMARY OF THE INVENTION

The object of the present invention is hence to realise a simply adjustable wheelchair in which the various parts are separately adjustable without additional alteration of other parts needing to be put into effect on such adjustment. Further, a pre-set safety function is maintained on adjustment of the wheelchair.

The object forming the basis of the present invention will be attained if the wheelchair intimated by way of introduction is characterised in that the frame comprises a lower frame section with the wheels of the wheelchair and an upper frame section with the seat and back rest of the wheelchair and also, where applicable, the foot rests of the wheelchair, the wheelchair including an adjustment device for vertical adjustment of the upper frame section in relation to the lower frame section.

Further advantages will be attained if the wheelchair according to the present invention is moreover given one or more of the characterising features as set forth in appended claims 2 to 10.

BRIEF DESCRIPTION OF THE DRAWINGS

The present invention will now be described in greater detail hereinbelow with reference to the accompanying Drawings. In the accompanying Drawings.

DETAILED DESCRIPTION OF THE PREFERRED EMBODIMENT(S)

Figure 1:
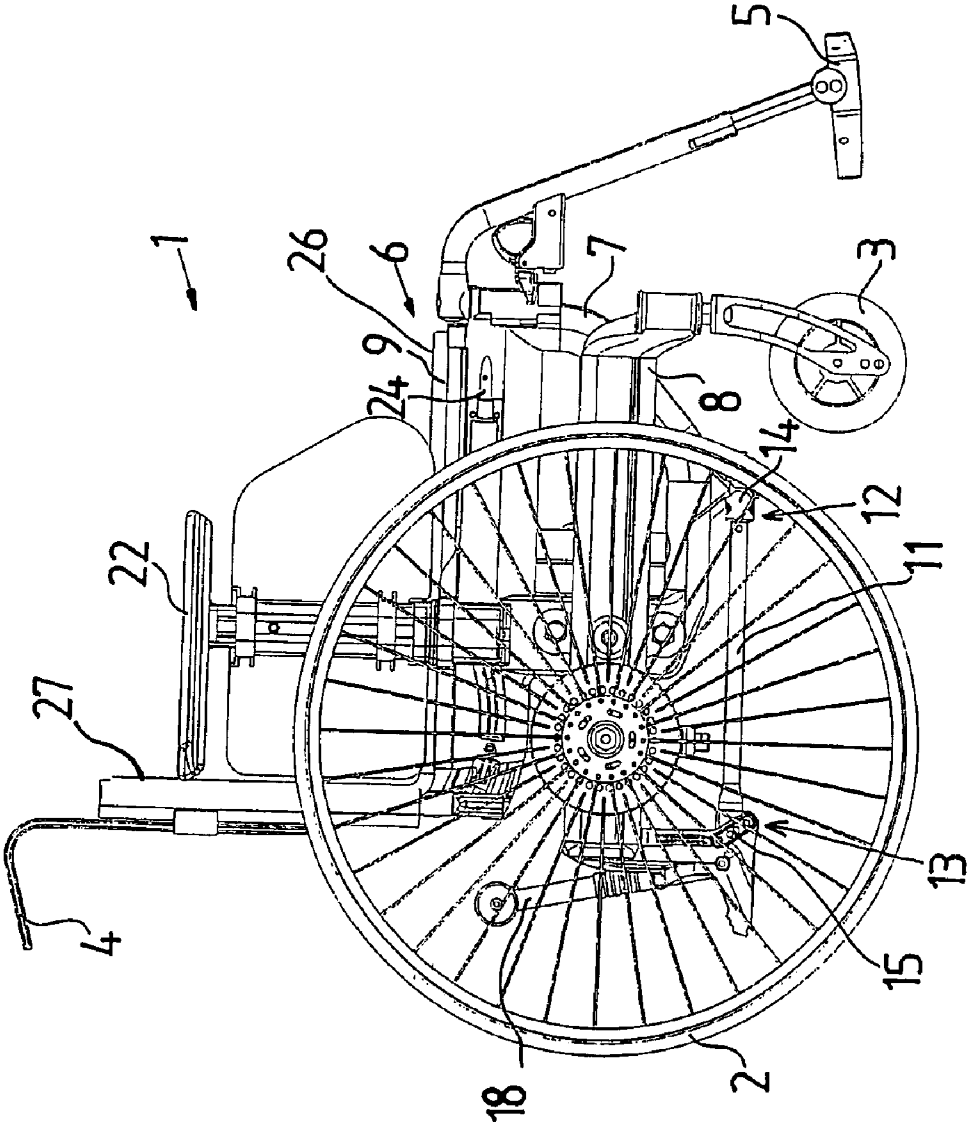
FIG. 1 is a straight side elevation of the wheelchair according to the present invention.

FIG. 1 shows the wheelchair 1 according to the present invention. The wheelchair 1 has a seat 26 and a back rest 27. Further, the wheelchair has two pairs of wheels 2, 3. The wheels 2, 3 are pairwise of different sizes. The larger wheels 2 are placed largely straight beneath the back rest 27 but behind the point of gravity of the wheelchair 1 in order to prevent the wheelchair 1 from spontaneously tipping backwards.

In conjunction with or in the proximity of the back rest 27, there are disposed a pair of handles 4 which are intended for propelling the wheelchair 1 when someone other than the user pushes it forwards.

Further, the wheelchair is provided with a pair of foot rests 5 which are, however, an optional accessory. Both the wheels 2, 3 and the seat 26, the back rest 27 and foot rests 5 are supported by a frame 6. In the wheelchair 1 according to the present invention, the frame 6 is divided into two parts, on the one hand an upper frame section 7 and on the other hand a lower frame section 8. The frame sections 7, 8 are adjustable in relation to one another.

The seat 26 of the wheelchair 1 lies in the same plane as two seat-supporting side struts, so-called seat tubes 9. These may be angled forwards and rearwards to the same degree and together with the upper frame section 7. Thus, a change of the seat angle is realised by an angling of the whole of the upper frame section 7. The upper frame section 7 is connected to the lower frame section 8 on the one hand by a pair of connection points 10 and on the other hand by the intermediary of a pair of stays 11. The stays 1 each have a front end 12 and a rear end 13. The front end 12 of the stay 11 is secured in the lower portion of the upper frame section 7. In the front end, there is advantageously disposed a damper device 14 to improve the running properties of the wheelchair. In the preferred embodiment, the damper device is an elastomer element. The rear end 13 of the stay 11 is, in the preferred embodiment, secured in the lower portion of the lower frame section 8. For fixing purposes, a series of holes 15 is provided which are disposed on a line or an arc which makes an angle to a vertical line. The different holes 15, which may vary in number, each correspond to a predetermined angle of the seat 26 and, thereby, the upper frame section 7. The higher up and further back a stay 11 of predetermined length is secured in the holes 15, the more forwardly inclined will be the seat 26, and vice versa. Hence, the seat angle is determined by in which hole 15 the rear end 13 of the stay is fixed.

For a maximum adaptation to different users, the back rest 27 is separately adjustable in relation to the seat angle. For a stepless adjustment, there are provided curved guides or recesses 16 in which an anchorage device may be fixed in optional position, and the back rest 27 thereby assumes a correspondingly optional position.

On the rear side of the back rest, there is provided, as mentioned above, a pair of handles 4. The handles 4 may be raised and lowered and may assume a large number of different positions.

In many cases, the user may need foot rests 5. These are disposed on the same part of the frame 6 as the seat 26, i.e. on the upper frame section 7. This implies that they are movable in the vertical direction together with the seat 26. Moreover, they are adjustable, for example may be angled, for adaptation to the user of the wheelchair 1, partly in respect of the user's body size and partly in respect of the user's method of using the wheelchair 1. Further, the foot rests 5 are raisable and lowerable if the need for them is only temporary. The foot rests may also be wholly dismounted if the user has no need for them at all. Naturally, it is also possible to dismount only one of the foot rests 5. Regardless of how the foot rests are adapted, their adjustment will remain unchanged on raising and lowering of the seat.

As was mentioned above, the wheelchair 1 has two pairs of wheels 2, 3. The front, smaller wheels 3 are each disposed on their pivotally arranged fork 17. On the wheel fork 17, the wheels 3 may assume two or more different vertical positions. This affords a possibility of adaptation to different sizes of the rear wheels 2. Moreover, the choice of size of the front wheels 3 and their position on the fork 17 could have a certain effect on the inclination of the frame 6. In order to obtain optimum running qualities, it is, however, necessary that the lower frame section be kept substantially horizontal, which restricts the choice of co-running front and rear wheels 3, 2. The size and type of wheel 2, 3 are often determined by the requirements placed by the user on running qualities. Thus, there are wheel types which are more suitable than others, for example, for off-road use.

The large wheels 2 are movable in a direction forwards and rearwards to a plurality of different positions in the form of holes 23 in the lower frame section 8. In the preferred embodiment, these holes 23 are four in number, but their number, as well as their mutual spacing, may be varied within broad limits. The placing of these wheels 2 is determined, on the one hand, by the sitting position of the user and ability to reach the wheels 2 for propelling forwards, and, on the other hand, by the point of gravity of the wheelchair 1 and the user together. The further back the point of gravity is, the further back should the wheels 2 be placed, in order to reduce the risk that the wheelchair 1 tips backwards on an upward slope.

In order further to prevent rearward tipping of the wheelchair 1, there is provided a pair of collapsible tilt safety devices 18. The tilt safety devices 18 are simply lowered down and remain in the lowered position until they are positively raised up again. When the tilt safety devices 18 are in their lowered position, they are normally not in contact with the floor, but are located a few cm above it. Only if the wheelchair 1 begins to tilt backwards will the tilt safety devices 18 come into contact with the ground and prevent the wheelchair 1 from keeling over. Like the wheels 2, 3, the tilt safety devices 18 are disposed on the lower frame section 8. They are independent of the height of the seat and need not be adjusted if the height is altered.

Figure 2:
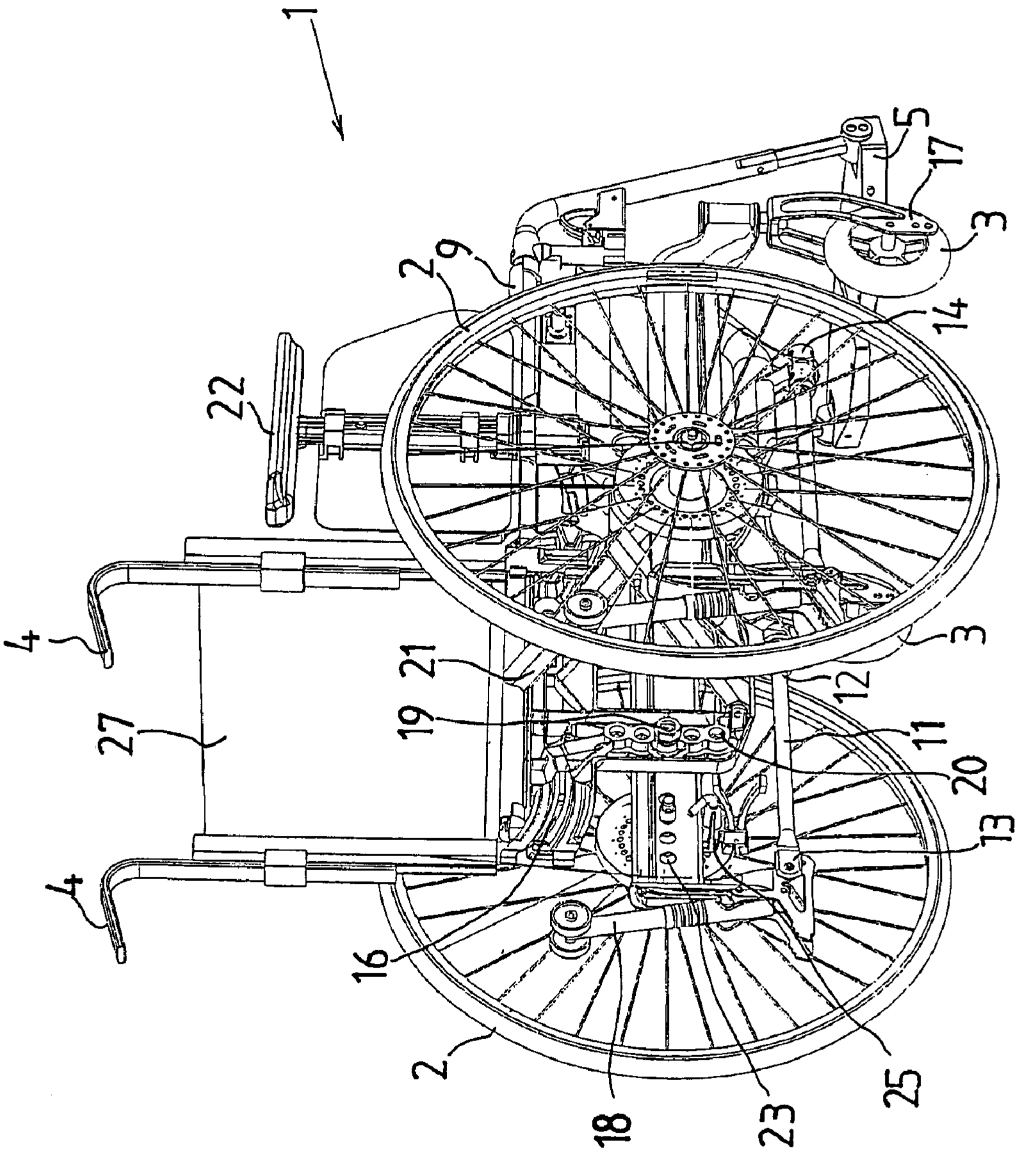
FIG. 2 is a view obliquely from the rear of the wheelchair according to FIG. 1.
Figure 3:
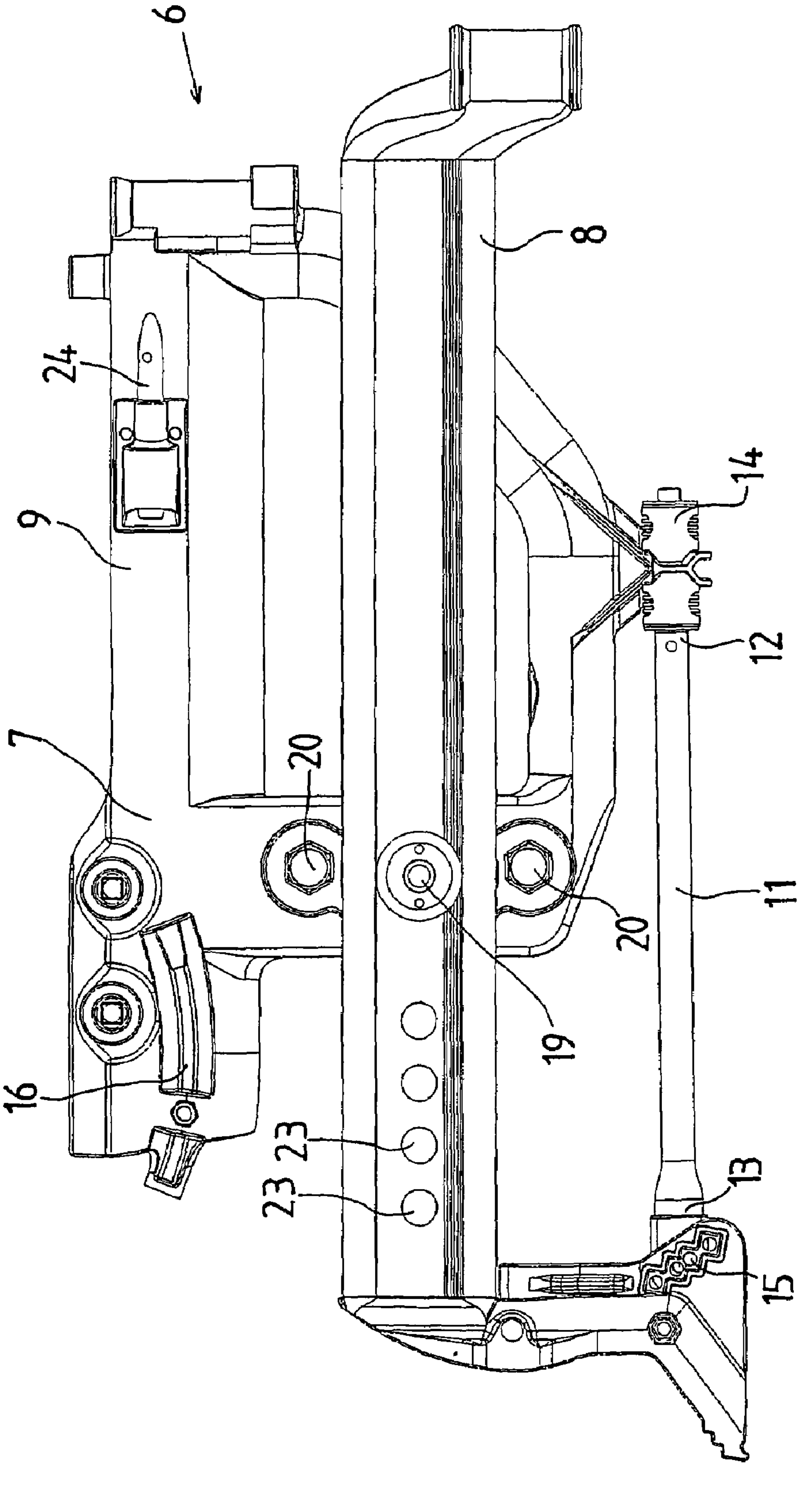
FIG. 3 is a straight side elevation of the split chassis or divided frame included in the wheelchair.

Another safety feature is the parking brakes 25 of the wheelchair 1 which in principle each comprise a pin which is insertible in one of a series of holes provided in a circle around the hub on each respective rear wheel 2. The brakes 25 are movable together with the wheels 2 if these are moved in a forward direction—rearwards between the different holes 23, since they are advantageously disposed on the same axle as each respective wheel inside. When the upper frame section 7 of the wheelchair 1 is moved upwards or downwards in relation to the lower frame section 8, neither the brakes 25 nor the rear wheels 2 are affected. The brakes 25 are connected via a brake cable to each of their operating devices 24. FIGS. 1–3 show a simplified form of operating device 24.

As was mentioned above, the frame 6 is split or divided into an upper frame section 7 and a lower frame section 8. The upper frame section supports the seat 26, back rest 27, arm rests 22 and foot rests 5 which are all constructional fittings which must be accurately adapted to suit the user. The lower frame section 8 supports substantially the smaller wheels 3 and the larger wheels 2 as well as the brakes 25 via the wheel axles in addition to the tilt safety devices 18. These constructional parts are adapted to both the user and the surroundings. The upper frame section 7 and the lower frame section 8 are, as was mentioned previously, in contact with each other partly at the connection points 10 and partly by the intermediary of the stay 11. The adjustment of the stay 11 affects the angle of the seat 26. When this angle has ultimately been set and the other adaptations of seat 26, back rest 27 and foot rests 5 have been carried out, it is in many cases important that these settings and adjustments be maintained. However, it is occasionally desirable—or even necessary—to carry out an adjustment of the height of the wheelchair 1. In general, the remaining settings of the wheelchair 1 need not be changed. Thus, it may be the intention to alter the height while maintaining the other settings. This applies particularly to the safety functions, i.e. the tilt safety devices 18 and the brakes 25. The connection points 10 on each side of the wheelchair 1 include a hole on each side of the lower frame section 8, as well as a plurality of holes 20 in the upper frame section 7. One of the holes in the upper frame section 7 may be placed in register with the hole in the lower frame section 8 and a connection device 19 is disposed through both of the holes in register with one another. The connection device 19 may, for example, consist of a bolt with a nut mounted thereon, but other variations such as fixedly disposed connection devices are also conceivable.

The holes 20 in the upper frame section 7 are disposed on an arc. Each hole 20 corresponds to a determined position in the vertical direction and the mutual spacing of the holes 20 from one another in the vertical direction is uniform. The configuration of the arc is carefully selected so that the seating angle of the wheelchair will be the same on a vertical adjustment, i.e. the previously set adjustment, regardless of which of the holes 20 is employed, on condition that the seating angle which was set with the aid of the stay 11 is not altered. On an alteration of the fixing of the stay 11 in the holes 15, the seating angle will be changed. The then obtained seating angle is, however, kept constant regardless of which of the holes 20 through which the connection device 19 extends. For each seating angle, there is thus a series of readily attainable different vertical adjustments which have their counterpart in the different holes 20.

On vertical adjustment, only the connection device 19 need be removed and the frame sections 7 and 8 be displaced in relation to one another. Since the seating angle is kept constant, and since the back rest 27, the seat 26 and the foot rests 5 are moved together with the upper frame section 7, no extra re-adjustments are required.

The arc on which each respective series of holes 20 is disposed is determined by the fact that the rear end 13 of the stay 11 is located in a constant position in the hole series 15. For different seating angles, this position may, however, be varied. Nevertheless, the holes 20 are disposed on one and the same arc.

Figure 4A:
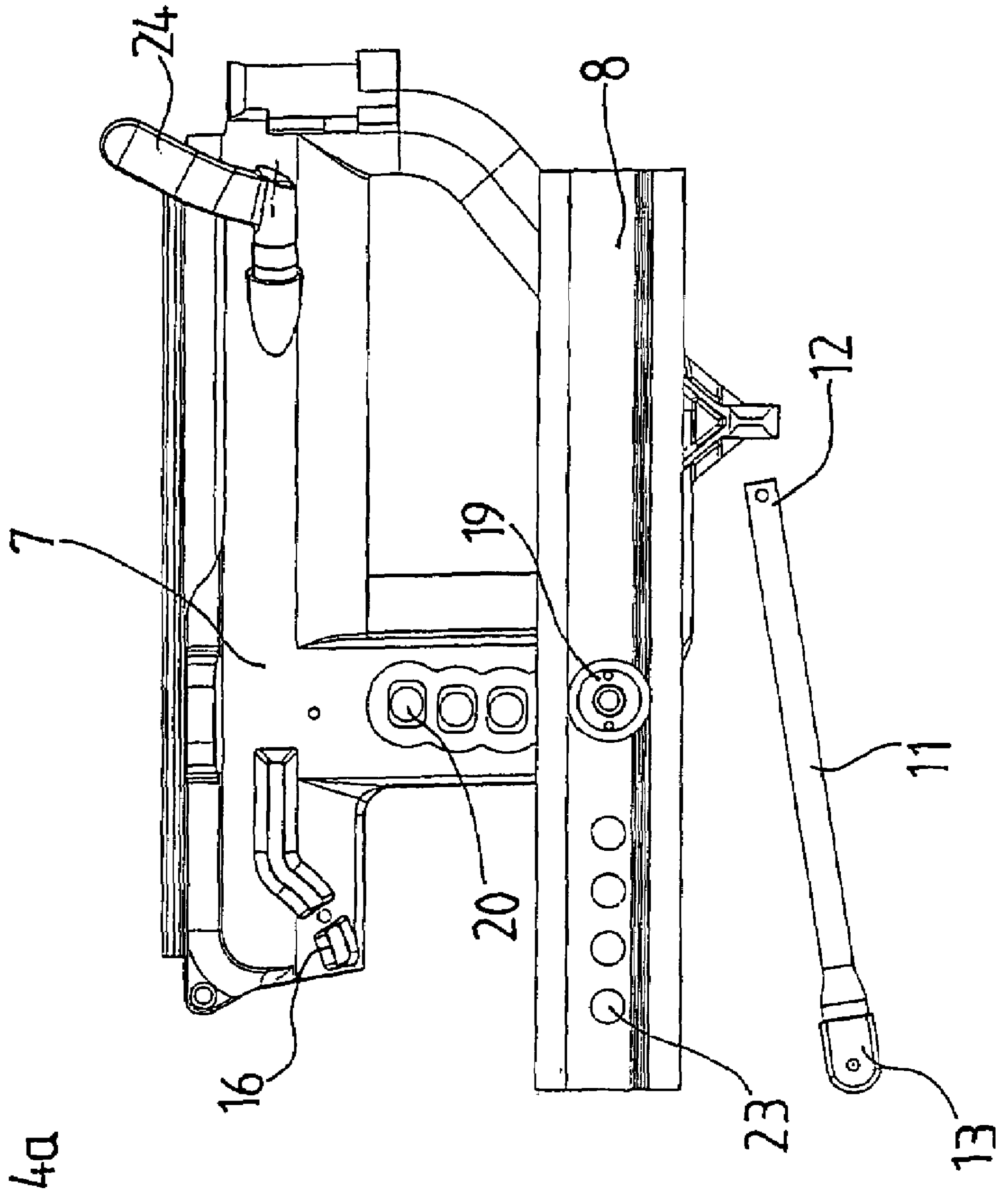
FIGS. 4*a, b* are views corresponding to that of FIG. 3 of a number of various vertical adjustments, alternative embodiments of a number of constructional components being shown.
Figure 4B:
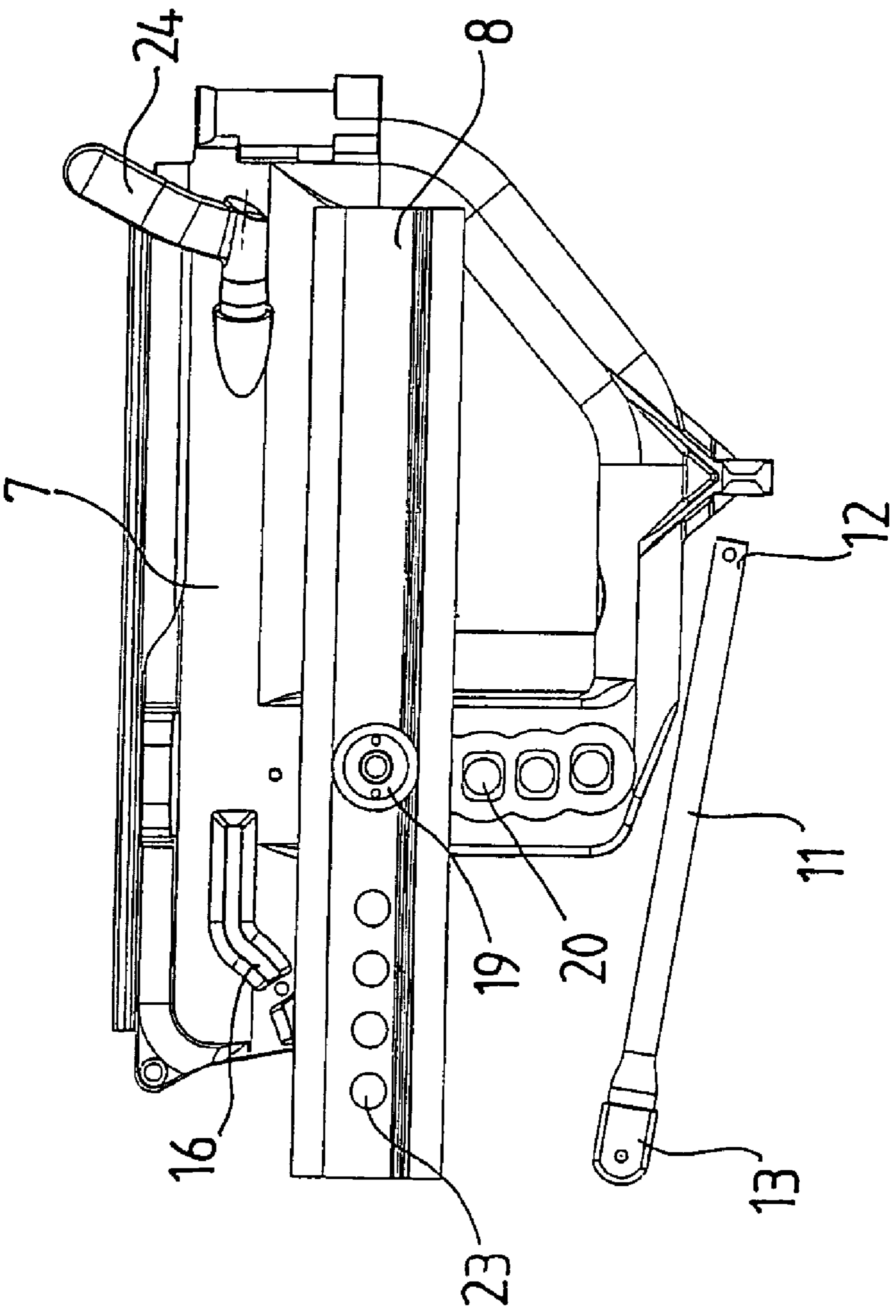

Purely practically, the placing of the holes 20 is determined as follows: at each adjusted seating angle, the stay 11 is of a fixed length and its rear end 13 is fixed in a fixed point 15. If, in this situation, it is desired to raise or lower the upper frame section 7, the front end 12 of the stay 11 will move in an arc of a circle and, in such instance, be located in its forward position when the stay 11 is substantially horizontal, as shown in FIG. 1. A change of the height of the wheelchair would entail that the front end 12 of the stay 11 would be affected if the holes 20 had been disposed straight above one another in a vertical line. Instead, the holes 20 are disposed on an arc which is designed so as to compensate for the movement of the front end 12 of the stay 11 and the seating angle is kept constant. In other words, if the front end 12 of the stay 11 is, for example, moved rearwards on a raising of the wheelchair 1, the whole of the upper frame section 7 must be moved rearwards in order for the angle of the seat 26 to be maintained. As a result, the pertinent hole 20 is disposed a corresponding distance further forward on the upper frame section 7. FIGS. 4*a* and *b* schematically illustrate two different settings of the height while maintaining the seating angle. In these figures, variations of the recess 16 and the operating device 24 are also shown.

The end points 12, 13 of the stay 11 constitute two of the corners of a triangle where the connection point 10 is the third corner which is opposed to the triangle side which consists of the stay 11.

In the foregoing, the division of the frame 6 into an upper frame section 7 and a lower frame section 8 was discussed. However, these two frame sections need not each be manufactured in their separate rigid piece, but may be divided and possibly hinged. In the preferred embodiment, the upper frame section 7 is manufactured in two halves which are pivotally connected to one another in order to render the wheelchair 1 collapsible. Two stays 21 most generally intersect one another beneath the seat and are pivotal in relation to one another for collapsing the wheelchair 1, for example on transport. The cross stays 21 are connected to the seat tube 9 whose mutual spacing is changed when the cross stays 21 are pivoted in relation to one another. In the preferred embodiment, the lower frame section 8 is further manufactured in two halves, i.e. a left and a right half. Both halves are disposed on each respective side of the upper frame section 7, but since the two halves are not directly interconnected to one another, they do not obstruct the collapsibility of the wheelchair 1.

In the foregoing, it was disclosed that the stay 11 is of a constant length and that its rear end 13 is displaced between the different holes 15 for adjusting the angle of the seat 26. One alternative is that the rear end 13 of the stay 11 is fixed in a single position, but that the length of the stay 11 is adjustable, for example telescopically. The position of the end 13 of the stay may be varied on the lower frame section 8. The stay 11 may further advantageously be calibrated for facilitating a symmetric setting of both sides of the wheelchair 1.

The damper device 14 may alternatively, for example, be a spring. It may in certain cases wholly be dispensed with and a simple pivot or similar connection may be provided in its place. Whatever alternative is selected depends on both requirements on running properties as well as cost aspects.

The present invention may be varied without departing from the scope of the appended Claims.

What is claimed is:

1. A wheelchair comprising:
- a frame which supports a pair of wheels, a seat, and a backrest;
- the seat in the backrest being adjustable in relation to one another;
- the frame comprising of lower frame section with the wheels of the wheelchair and an upper frame section with the seat and backrest;
- an adjustment device which vertically adjusts the upper frame section in relation to the lower frame section and adjust the seating angle;
- the adjustment device including the first series of adjustment positions which adjusts a connection point between the upper and the lower frame sections and adjusts the height of the wheelchair; and
- the adjustment positions having uniform mutual spacing in the vertical direction, mutual spacing in the horizontal direction chosen such that a seating angle is kept constant at a new vertical adjustment position while the adjustment device is otherwise unaffected,
- wherein the adjustment device includes at least one stay which, at its ends, is connected to the upper frame section and to the lower frame section.

2. The wheelchair according to claim 1, further comprising foot rests and said foot rests being adjustable.

3. The wheelchair as claimed in claim 1, wherein the upper frame section and the lower frame section are interconnected to one another at at least one connection point so that a triangle is formed of the at least one connection point and the end points of the at least one stay and, the at least one connection point being opposed to that side of the triangle which comprises the at least one stay.

4. The wheelchair as claimed in claim 3, wherein the adjustment device includes a second series of adjustment positions which adjust a rear end point of the at least one stay in relation to the lower frame section and adjust the seating angle.

5. A wheelchair comprising:
- a frame which supports a pair of wheels, a seat, and a back rest;
- the seat and the back rest being adjustable in relation to one another;

the frame comprising a lower frame section with the wheels of the wheelchair and an upper frame section with the seat and the back rest;

an adjustment device for vertical adjustment of the upper frame section in relation to the lower frame section;

the adjustment device including a series of adjustment positions for adjusting a connection point between the upper and the lower frame sections;

the adjustment positions having uniform mutual spacing in the vertical direction, mutual spacing in the horizontal direction chosen such that a seating angle is kept constant at a new vertical adjustment position while the adjustment device is otherwise unaffected;

the adjustment device including at least one stay which, at its ends, is connected to the upper frame section and to the lower frame section;

the upper frame section and the lower frame section being interconnected to one another at at least one connection point so that a triangle is formed of the at least one connection point and the end points of the at least one stay and, the at least one connection point being opposed to that side of the triangle which comprises the at least one stay; and wherein the adjustment device includes a series of adjustment positions for adjusting a rear end point of the at least one stay in relation to the lower frame section.

6. The wheel chair as claimed in claim 5, wherein the adjustment positions comprise holes.

7. The wheelchair as claimed in claim 1, wherein the at least one stay is adjustable in its longitudinal direction.

8. A wheelchair comprising:

a frame which supports a pair of wheels, a seat, and a back rest;

the seat and the back rest being adjustable in relation to one another;

the frame comprising a lower frame section with the wheels of the wheelchair and an upper frame section with the seat and the back rest;

an adjustment device for vertical adjustment of the upper frame section in relation to the lower frame section;

the adjustment device including a series of adjustment positions for adjusting a connection point between the upper and the lower frame sections;

the adjustment positions having uniform mutual spacing in the vertical direction, mutual spacing in the horizontal direction chosen such that a seating angle is kept constant at a new vertical adjustment position while the adjustment device is otherwise unaffected;

the adjustment device including at least one stay which, at its ends, is connected to the upper frame section and to the lower frame section; and wherein the at least one stay includes a resilient or damper element.

9. The wheelchair as claimed in claim 8, wherein the resilient or damper element comprises an elastomer element.

10. The wheelchair as claimed in claim 8, wherein the resilient or damper element is replaceable for realizing an alteration of road properties of the wheelchair.

* * * * *